United States Patent [19]

Lowther et al.

[11] Patent Number: 5,209,946
[45] Date of Patent: May 11, 1993

[54] TREATMENT OF TUBULARS WITH GELATIN CONTAINING MAGNETIC PARTICLES

[75] Inventors: Frank E. Lowther, Plano; Alden W. Olsen, Allen, both of Tex.

[73] Assignee: Atlantic Richfield Company, Los Angeles, Calif.

[21] Appl. No.: 853,874

[22] Filed: Mar. 18, 1992

Related U.S. Application Data

[63] Continuation of Ser. No. 705,456, May 24, 1991, abandoned.

[51] Int. Cl.$^5$ .............................................. B05D 5/12
[52] U.S. Cl. ................................... 427/128; 427/239; 427/598
[58] Field of Search ...................... 427/128-132, 427/48, 239, 598; 428/694; 252/62.54

[56] References Cited

U.S. PATENT DOCUMENTS 2,598,170  5/1952  Huebotter ........................ 427/239
3,855,137 12/1974  Whitney ......................... 252/62.51

OTHER PUBLICATIONS

Pipe Line Pigging Technology, Tiratsoo, May 1989 pp. 139-146.

Primary Examiner—Bernard Pianalto
Attorney, Agent, or Firm—Drude Faulconer

[57] ABSTRACT

A method and apparatus for treating tubulars (e.g. pipelines, flowlines, tubing, casing, etc.) for corrosion, drag reduction, or the like wherein a mass comprised of a gelatin mixture and magnetic particles is passed through the tubular to deposit a protective layer onto the inner wall of the tubular. The micro particles of magnetized material are entrained within the mass of gelatin and are deposited along with the gelatin to aid in adhering the protective layer on the tubular wall.

14 Claims, 2 Drawing Sheets

COLD GELATIN

HOT GELATIN

HOT MIXTURE

COLD MIXTURE

TREATMENT OF TUBULARS WITH GELATIN CONTAINING MAGNETIC PARTICLES

This application is a continuation of application Ser. No. 07/705,456, filed May 24, 1991 abandoned.

DESCRIPTION

1. Technical Field

The present invention relates to the use of gelatin for the treatment of tubulars and in one of its aspects relates to the treatment of tubulars for corrosion, drag reduction, and the like wherein a mass of gelatin containing magnetic particles and preferably a treating solution, e.g. corrosion inhibitor, drag reducer, etc. is passed through the tubular to deposit a protective layer onto the wall of the tubular.

2. Background Art

Most tubulars which carry fluids, e.g. pipelines, well conduits, flow conduits in refineries, etc., must be treated periodically to extend their operational life and/or to improve and maintain their operating efficiencies. For example, pipelines and other conduits used for transporting crude oil and/or natural gas which contain even small amounts of water routinely experience severe corrosion problems which, if not timely treated, can result in early failure of the line. Also, the interior surfaces of such pipes have a substantial "roughness" even when new which increases with scaling, pitting, etc. during operation. As this roughness increases, the friction or "drag" between the pipe wall and the fluids flowing therethrough increases thereby substantially reducing the flowrate through the pipeline.

In most known corrosion and drag reduction treatments of tubulars, a layer or film of an appropriate treating solution, i.e. corrosion inhibitor or drag reducer, is deposited onto the interior surface or wall of the pipeline. In corrosion treatment, the film of corrosion inhibitor protects the pipe wall from contact with water or other electrolytes or oxidizing agents while in drag reduction, the film of drag reducer effectively fills in the pits, etc. in the pipe wall to smooth out the wall surface to thereby reduce the friction between the flowing fluids and the pipe wall. In still other instances, the pipeline may be treated for other problems, e.g. bacteria buildup, etc. wherein different treating solutions may be used, e.g. biocides, herbicides, etc.

There have been several techniques proposed for providing a film of treating solution onto the wall of a tubular. For example, probably the most commonly-used technique in flowing pipelines is to merely add a treating solution to the fluids which are flowing through the pipeline and/or periodically flowing a slug of a different liquid treating solution through the line. Due to the properties of treating solution, it migrates outward against the pipe wall and adheres thereto; hopefully forming a relatively uniform layer or thin film on the entire surface of the wall. Of course, insuring that a uniform layer of solution will actually be deposited onto the wall of a pipeline through which fluids are flowing and that the chemicals will readily adhere thereto is extremely difficult, if possible at all, since these types of treating solutions rely on weak chemical bonds to "stick" and hold the solution on the wall. Further, the amount of treating solution that must be added to the flowing fluids is several magnitudes greater than is required to form the thin layer of film on the pipe wall so large volumes of solution are wasted with no benefits being derived therefrom. As can be imagined, the large volumes of excess solution required for this technique makes it very expensive.

Still further, the excess and unused solution in the treating solution has been found to "coat" particulates, (e.g. sand) entrained in the flowing fluids which seriously affects the processing of the fluids once they have reached their distination since it is extremely difficult to separate the coated particles from the fluids with standard equipment.

Other techniques for treating tubulars involve flowing slugs of treating solution between solid plugs or "pigs" (i.e. members that move free in the pipeline and act as pistons) or dispensing the solution directly onto the wall from specially-designed pigs as they move through the pipeline. In addition to the costs involved in the use of excess solution and the uncertainty of providing a uniform layer of solution on the wall, there are several other drawbacks involved in using solid pigs in the treatment of tubulars. For example, special pig "launchers" and "catchers" have to be built and installed into the pipeline which adds substantially to the cost and handling problems. Also, these pigs are substantially rigid and have substantially constant diameters which hinders the pig from negotiating bends in the pipeline and limits its ability to pass through restricted diameters (e.g. chokes) in the line.

One tubular treating technique which overcomes many of the drawbacks associated with the above-discussed prior art methods is one which uses a "gelled" pig or pigs, see Canadian Patent 957,910. The gelled pig is formed by gelling a liquid hydrocarbon with a gelling agent, e.g. alkyl orthophosphate ester, and an activator, e.g. sodium aluminate. This pig, which may also contain a corrosion inhibitor, is forced through the pipeline by either a liquid or a gas to deposit a corrosion-protective layer on the pipe wall. This technique is attractive since gelled pigs have several advantages over more-rigid pigs,; that is, gelled pigs resiliently deform to (1) pass through tubulars of differenting diameters; (2) pass through line restrictions such as chokes; and (3) compress to expand radially to thereby remain in contact with the wall of the pipe over long distances.

Another method recently proposed for treating tubulars for corrosion, drag reduction, and the like is disclosed in co-pending U.S. patent application Ser. Nos. 07/693,164, filed Apr. 10, 1991 and 07/697,543, filed May 9, 1991, U.S. Pat. No. 5,135,053 both commonly assigned to the present Assignee) where mass of gelatin with or without a treating solution is passed through the tubular to deposit a protective film of gelatin preferably containing a treating solution onto the wall of the tubular. The gelatin ablates onto the wall and "sticks" there to provide a protective layer against corrosion and to reduce drag in the tubular.

SUMMARY OF THE INVENTION

The present invention provides a method and apparatus for treating well tubulars (e.g. pipelines, flowlines, tubing, casing, etc.) for corrosion, drag reduction, or the like wherein a mass comprised of a gelatin mixture and magnetic particles is passed through the tubular to deposit a protective layer onto the inner wall of the tubular. As used herein, "protective layer" is used collectively to include any layer of gelatin and magnetic particles whether of not that layer contains a corrosion inhibitor and/or a drag reducer and/or other treating solution. The micro particles of magnetized material are entrained within the mass of gelatin and are deposited along with the gelatin.

The magnetic particles are magnetically attracted to each other in the case where the tubular is comprised of non-magnetic material, e.g. aluminum, PVC, etc., and to each other and the tubular wall, itself, where the tubular is comprised of a magnetic material, e.g. steel. This attraction produces a magnetic force which compliments the "sticking" property of the gelatin and reinforces the adhesion of the protective layer. Also, the magnetic particles are sized so that they are smaller than the pits, etc. in the tubular wall which constitutes the "roughness" of the wall. This allows the particles to attach themselves within the pits, grooves, etc., thereby at least partially filling the pits which, in turn, smoothens the wall surface and reduces the drag between flowing fluids and the tubular wall.

More specifically, in accordance with the present invention a mass comprised of a gelatin mixture and magnetic particles and preferably containing a treating solution is positioned within the tubular to be treated. This mass is formed by mixing common gelatin (e.g. commercial grade A or B gelatin) with a heated liquid (at about 170° F.) which preferably contains a treating solution (e.g. corrosion inhibitor, drag reducer, etc.). Magnetic particles, (e.g. magnetized micro particles of iron oxide having effective diameters of from about 0.02 micron to about 12 microns) are mixed into this gelatin mixture. The mass is preferably formed in situ within the tubular and can be passed through the tubular either in an ungelled state or it can be allowed to cool to form a gelled pig before it is passed through the tubular. Further, if it is to be used as a gelled pig, the pig can be molded externally and then inserted into the tubular.

In some applications (e.g. high temperature wells), a hardener (e.g. an aldehyde) is used to strengthen the protective layer and to increase the temperature at which the gelatin in the layer will melt. The hardener can be added to the mass, itself, or it can be flowed through the tubular behind the mass.

BRIEF DESCRIPTION OF THE DRAWINGS

The actual construction, operation, and apparent advantages of the present invention will be better understood by referring to the drawings in which like numerals refer to like parts and in which.

BEST KNOWN MODE FOR CARRYING OUT INVENTION

In accordance with the present invention, a treatment is provided for tubulars wherein a mass (i.e. a liquid slug or a gelled "pig") is passed through a tubular to deposit a relatively thin protective film or layer onto the wall of the tubular. As used herein, "tubular" is meant to include any metallic pipe or conduit (e.g. pipelines, well casings and tubings, refinery flowlines, etc.) through which fluids and particulates are flowed. The mass is comprised of gelatin, magnetic particles, and preferably a treating solution (e.g. corrosion inhibitor, drag reducer, etc.).

Gelatin is a material which is capable of recovering from large deformations quickly and forcibly which allows a mass formed of gelatin to easily negotiate bends, constrictions, and the like in a tubular. Due to the ambient heat in the tubular and/or the heat generated by the moving slug or pig against the wall of the pipe, the gelatin "ablates" to deposit a layer of gelatin, magnetic particles, and any treating solution contained therein onto the inner wall of the tubular, as will be further explained below.

As is well known, "gelatins" are high molecular weight polypeptides derived from collagen which, in turn, is the primary protein component of animal connective tissue (e.g. bones, skin, hides, tendons, etc.). Gelatin, which is commonly used in foods, glues, photographic and other products, does not exist in nature and is a hydrolysis product obtained by hot water extraction from the collageous raw material after it has been processed with acid, alkaline, or lime. The viscosity of aqueous gelatin solutions increases with increasing concentrations and decreasing temperatures. For a more complete description and discussion of gelatin, its compositions and properties, see ENCYCLOPEDIA OF CHEMICAL TECHNOLOGY, Kirk-Othmer, 3rd Edition, Vol. 11, J. Wiley & Sons, N.Y., pps. 711 et sec.

While gelatin, itself, effectively adheres to the tubular walls in most applications, in the present invention, this adhesion is reinforced by the magnetic particles which are thoroughly mixed and entrained in the mass of gelatin and which are deposited along with the gelatin onto the wall of the tubular. The latent magnetism of these particles provide a magnetic force which attract each other and to the wall of the tubular where the tubular is of magnetic material, e.g. steel.

The magnetic particles are comprised of magnetized micro-sized particles of a supermagnetic material (e.g. iron oxide) of the type commonly used in printer inks, toners, etc., (e.g. magnetic particles commercially-available from Wright Industries, Inc., Brooklyn, N.Y. such as Type 4000 (0.05 micron diameter particles); Type 012672 (0.3 microns); Type 041183 (12 microns) etc.).

Figure 1:
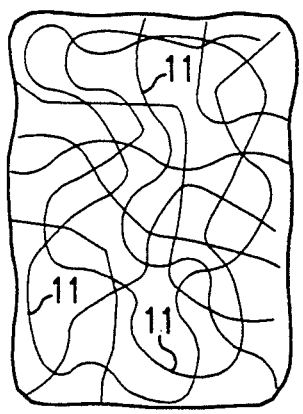
FIG. 1 is an idealized representation of gelatin molecules in a cooled aqueous solution;.
Figure 2:
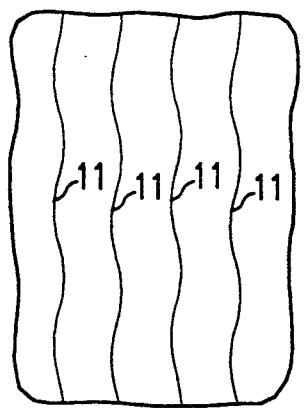
FIG. 2 is an idealized representation of the gelatin molecules of FIG. 1 in a heated state.
Figure 3:
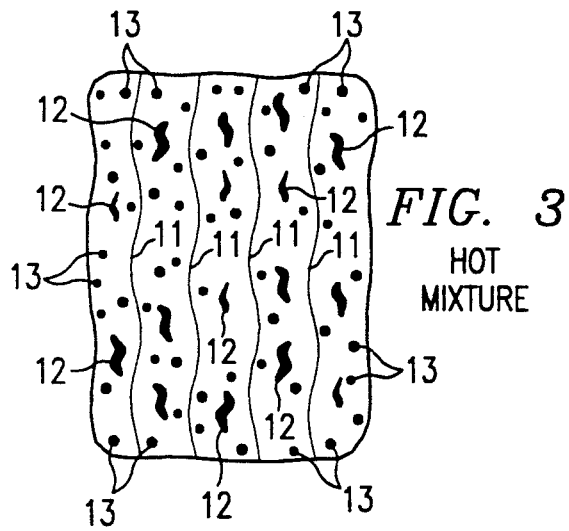
FIG. 3 is an idealized representation of the heated gelatin molecules of FIG. 2 with magnetic particles and molecules of a treated solution blended therein.
Figure 4:
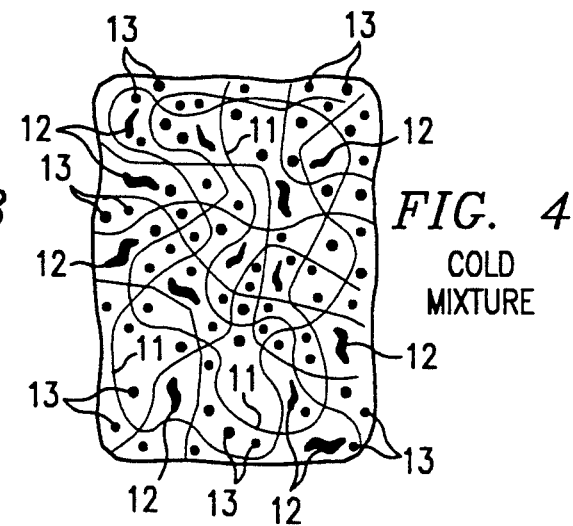
FIG. 4 is an idealized representation of the gelatin, magnetic particles, and treating solution molecules of FIG. 3 after cooling.

The gelatin, itself, acts a treating agent (e.g. as a corrosion inhibitor and/or a drag reducer) when deposited onto the tubular wall. Preferably, however, in the present invention, a separate treating solution is also incorporated into the gelatin mixture along with the magnetic particles. Referring to the drawings, FIG. 1 is a highly idealized representation of an aqueous solution of gelatin molecules 11 as they appear in a cooled state while FIG. 2 represents the molecules as they appear when heated (e.g. above 180° F.). Molecules of a treating solution 12 and micro magnetic particles 13, preferably of different diameters, are blended into the hot gelatin mixture (FIG. 3) and become entrained within the gelatin molecules 11 as the gelatin mixture is cooled back to room temperature (FIG. 4).

In the present invention, if the treatment of a tubular is primarily to inhibit corrosion, the treating solution 12 may be comprised of almost any known corrosion inhibitor of the type used to treat tubulars. Examples of good corrosion inhibitors are (1) an aqueous blend of fatty acid imidazoline quaternary compound and alcohol, e.g. commercially-available as NALCO 3554 INHIBITOR; (2) an alkylamide polyamide fatty acid sulfonic acid salt in a hydrocarbon solvent, e.g. YISCO 945 CORROSION INHIBITOR; (3) an imidazoline fatty acid, e.g. OFC C-2364 CORROSION INHIBITOR. For examples of other corrosion inhibitors, see co-pending U.S. patent application Ser. No. 07/566,186, filed Aug. 13, 1990 and commonly-assigned with the present invention.

If the treatment of a well tubular is primarily to reduce drag, any known drag reducer of the type used to reduce drag in tubulars can be incorporated into the gelatin pig. For example, many of the above-identified corrosion inhibitors are also good drag reducers thereby producing the combined benefits of reducing drag and inhibiting corrosion. Also, high molecular weight (e.g. $10^6$) homopolymers, e.g. polyethylene oxide, are good drag reducers in that the high weight molecules at least partially "fill" any indentations in the pipewall to "smooth" out the roughness of the wall thereby reducing drag between the pipewall and the flowing fluids. Other treating solutions such as biocides, herbicides, etc. also can be incorporated into the gelatin if desired for a particular treatment.

When formulating a gelatin mass in accordance with the present invention, it has been found that the hardness (i.e. firmness of the cooled gelatin) is primarily dependent on the amount of gelatin in the mass and is relatively independent on the composition of the water/treating solution used with the gelatin. For example, a pig formed with approximately 17% gelatin and a liquid comprised of 30% water and 70% treating solution (e.g. NALCO 3554 INHIBITOR) has substantially the same hardness as that of a pig formed with the same amount of gelatin and a liquid comprised of 70% water and 30% treating solution (NALCO 3554). While it should be recognized that the exact formulation of a particular gelatin mass may vary with the actual components used, the environment in which the mass is to be used, the treatment to be carried out, etc., the following example illustrates a typical composition for a gelatin mass in accordance with the present invention:

Thirty-six percent (36%) by weight of a treating solution (e.g. NALCO 3554) is mixed thoroughly with equal amount (36%) of by weight of hot water (180° F). Fourteen point four percent (14.4%) by weight of gelatin is blended into the hot liquid mixture along with thirteen and one-half percent (13.5%) by weight of magnetic particles, e.g. magnetized iron oxide. The temperature of the gelatin-liquid-magnetic particle mixture at this point should be at least 170° F. If the mass is to be used in a gelled state, this mixture is allowed to cool to ambient temperature (e.g. room temperature) to thereby form a "pig". If a slug of ungelled gelatin is to be used, this same formulation is applicable except the gelatin is not cooled before it is passed through the tubular.

Figure 5:
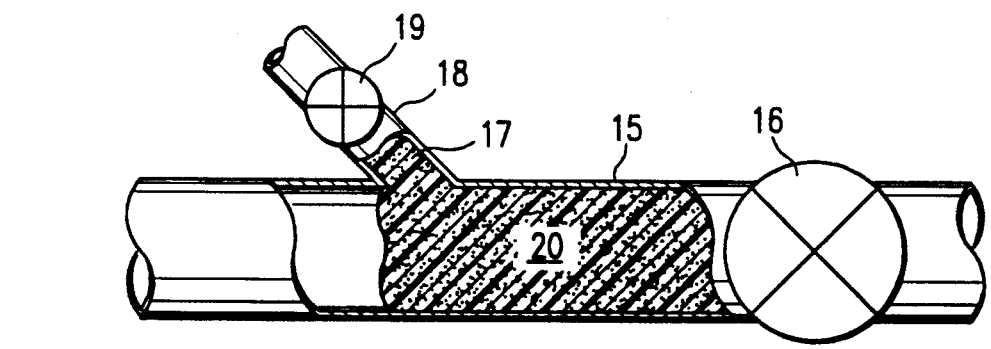
FIG. 5 is an elevational view, partly in section, of a gelatin mass within a tubular.

If the gelatin mass is to be used in a gelled pig, the hot mixture may be poured into an appropriate mold where it is allowed to cool to produce a pig basically in the shape of the mold which, in turn, is designed for a particular application, before the pig is inserted into the tubular. Preferably, however, it is molded in situ inside the tubular, itself. Referring again to the drawings, FIG. 5 discloses a tubular (pipeline 15) having a valve 16 therein. A gelatin-hot liquid mixture 17 (e.g. at 170° F.) is flowed into pipeline 15 and up against closed valve 16 through an inlet conduit 18 having a valve 19.

The gelatin-liquid mixture builds up in the pipeline and is allowed to cool to form the gelatin pig 20. Valve 19 is then closed and valve 16 is opened. Flow is then established in the pipeline behind pig 20 which forces it through open valve 16 and on through pipeline 15. Due to the properties of gelatin, pig 20 will deform as it passes through the restrictive diameter of valve 16a and then will substantially return to its original configuration.

While it is preferable to allow the gelatin mass to cool to form a gelled pig, it should be recognized that the mass may also be flowed through tubular 16 in an ungelled state as a slug, if desired, to deposit the protective layer onto the inner wall of the pipe. In either case, the mass of gelatin 20 is passed through tubular 15 by fluid flowing behind the mass of gelatin 20.

The pressure from the fluids being pushed ahead of mass 20 acts on the leading edge of the mass while the pressure of the fluids behind the mass acts on the rear edge. These opposite acting pressures push towards each other along the longitudinal axis of the mass which radially-expands the perimeter of the mass 20 thereby continuously forcing the perimeter into contact with the tubular wall at all times, even as the material in the mass is being deposited onto the wall.

Figure 6:
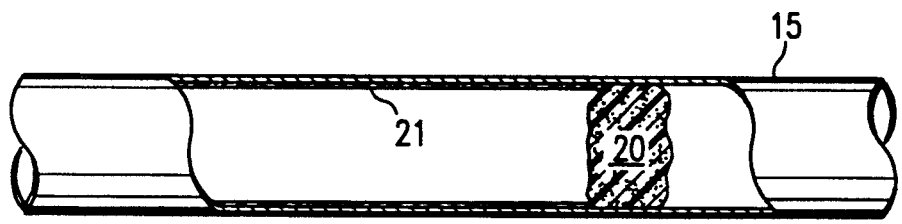
FIG. 6 is an elevational view, partly in section, of the mass of FIG. 5 after it has partially passed through the tubular.

The temperature of the tubing 15 and/or the heat generated by mass 20 as it moves along in contact with the inner wall of tubular 15 causes the mass to ablate thereby depositing a layer 21 (FIG. 6) of combined gelatin, magnetic particles, and treating solution onto the tubing wall. The temperature at which a typical gelled gelatin pig ablates is around 100° F.. The magnetic particles entrained in the gelatin are magnetically attracted and attached the inner wall of the metallic tubular thereby reinforcing the bonding of the protective layer onto the wall.

Figure 7:
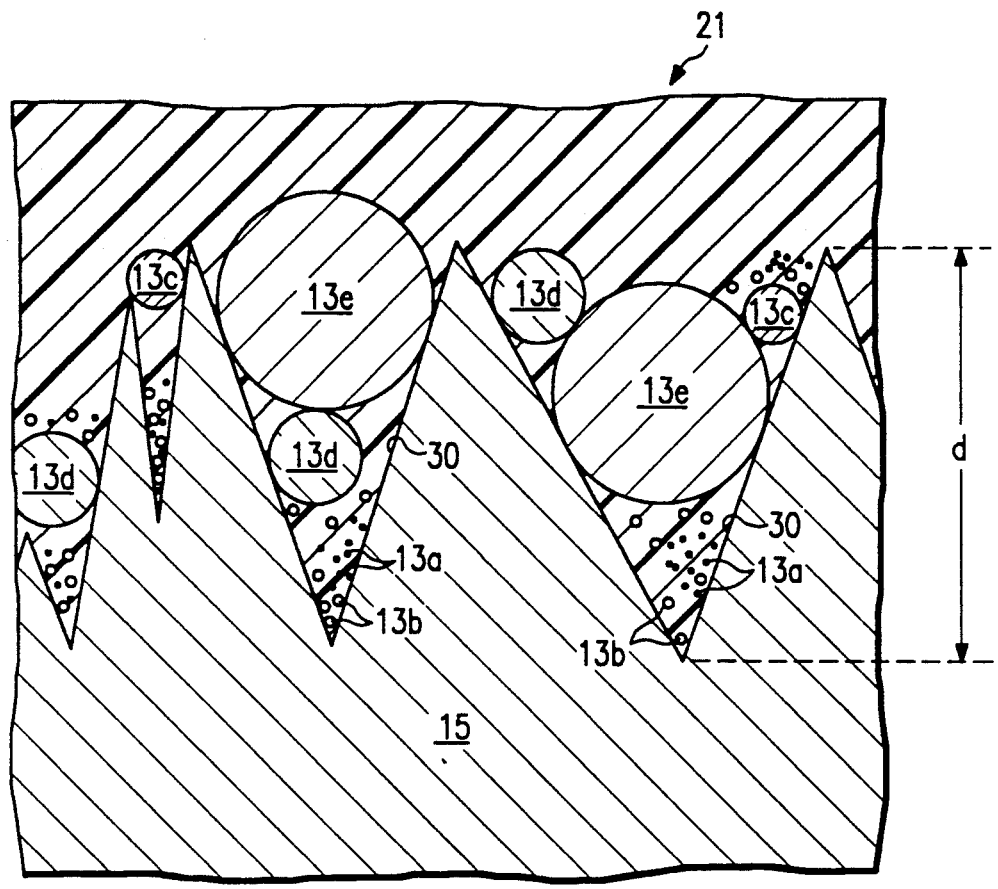
FIG. 7 is a sectional view of a highly magnified section of a tubular wall with the protective layer of the present invention deposited thereon.

As shown in FIG. 7, the magnetic particles are sized so that they will fit into and at least partially fill the "pits" or other indentations 30 which are inherently present in the wall of the tubular 15, i.e. the "roughness" of the pipe wall. As illustrated, the depth "d" of a typical indentation 18 in the wall of the tubular is approximately 600 microinches or 20 microns while the diameters of magnetic particles 13a, 13b, 13c, 13d, and 13e are approximately 0.05 microns, 0.3 microns, 2 microns, 5 microns, and 12 microns, respectively. By using a mixture of particles having diameters of various sizes, there is a more complete "filling" of the indentations in the tubular wall whereby the roughness of the wall is "smoothed out", thereby substantially reducing the friction or "drag" between the wall and any fluids flowing through the tubular. Further, where the tubular is made of magnetic material, e.g. steel, more of the entrained magnetic particles are exposed to a magnetic surface (i.e. the walls of indentations 30) and accordingly, the magnetic particles are able to exert a stronger bond for holding the protective layer of gelatin and treating solution on the wall.

In some tubular treatments, the ambient temperature in the tubular may be high enough (e.g. substantially above 100° F.) to seriously affect the ability of the gelatin in layer 21 to adhere to the pipewall after it has been deposited thereon. That is, excessive temperatures may cause the gelatin in layer 21 to "melt" and be swept away by the fluids flowing in the pipeline. Accordingly, in accordance with one embodiment of the present invention, a "hardener" is used to react with the gelatin to protect the gelatin against softening or melting at elevated temperatures. The hardener toughens the gelatin in layer 21 by cross-linking and makes it resistant to abrasion. It also increases the apparent viscosity of the gelatin and the temperature at which the gelatin will melt.

Figure 8:
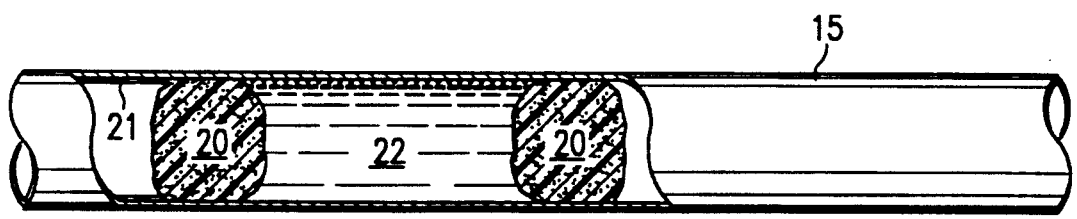
FIG. 8 is an elevational view of a tubular being treated in accordance with the present invention wherein a hardener is flowed through the tubular between two gelatin masses.

Examples of such hardeners (e.g. formaldehydes) are those used to harden gelatin in photography applications, see THE THEORY OF THE PHOTOGRAPHIC PROCESS, Third Edition, The Macmillan Co., N.Y. Chapter 3, pps. 45–60. The hardener may be added to the gelatin mass to control the melting or ablating point of the mass, itself, or the hardener can be positioned between two masses 20, as shown in FIG. 8, whereby it comes into contact with the gelatin after layer 21 has been deposited onto the tubular wall.

What is claimed is:

1. A method for treating a tubular comprising:
    passing an ablating mass of gelatin through said tubular wherein said mass contacts the interior wall of said tubular and ablates to deposit a layer of gelatin and magnetic particles on said wall; said mass comprising;
    a mixture of (a) common gelatin of the type derived from collagen and used in foods, glues, and the like, (b) a heated liquid, and (c) magnetic particles wherein said mixture is then cooled to allow said gelatin mixture to gel and form said ablating mass of gelatin.

2. The method of claim 1 wherein said mass of gelatin and magnetic particles is in the form of a gelled pig.

3. The method of claim 2 wherein said gelled pig is formed by mixing gelatin and magnetic particles with a heated liquid which is then allowed to cool to ambient temperature.

4. The method of claim 3 wherein said heated liquid is at a temperature of about 170° F. and said ambient temperature is less than about 100° F.

5. The method of claim 3 wherein said pig is formed by allowing the gelatin-heated liquid mixture to cool in a mold before it is inserted into said well tubular.

6. The method of claim 3 wherein said gelatin and heated liquid are mixed in said tubular and allowed to cool therein to form said pig in situ in said tubular.

7. The method of claim 1 wherein said mass of gelatin and magnetic particles is in the form of a ungelled liquid slug.

8. The method of claim 1 wherein said mass of gelatin and magnetic particles includes:
    a treating solution.

9. The method of claim 8 wherein said treating solution comprises:
    a corrosion inhibitor.

10. The method of claim 8 wherein said treating solution comprises:
    a drag reducer.

11. The method of claim 1 wherein said heated liquid is at a temperature of about 170° F.

12. The method of claim 1 including:
    adding a hardener to said mass of gelatin for increasing the strength of said protective layer.

13. The method of claim 12 wherein said hardener comprises:
    an aldehyde.

14. The method of claim 1 including:
    passing a solution containing a hardener through said tubular behind said mass of gelatin to react with said protective layer on said wall to increase the strength of said layer.

* * * * *